May 2, 1967 TUTOMU HANAFUSA 3,317,866

AUTOMATIC CIRCUIT INTERRUPTER HAVING MAGNETIC BLOWOFF MEANS

Filed Jan. 31, 1964 8 Sheets-Sheet 1

Tutomu Hanafusa
Inventor

By Wenderoth, Lind and Ponack,
attorneys

Tutomu Hanafusa
Inventor
By Wenderoth, Lind and Ponack,
attys.

May 2, 1967 TUTOMU HANAFUSA 3,317,866

AUTOMATIC CIRCUIT INTERRUPTER HAVING MAGNETIC BLOWOFF MEANS

Filed Jan. 31, 1964

8 Sheets-Sheet 3

Tutomu Hanafusa
Inventor

By Wenderoth, Lind and Ponack
attorneys

May 2, 1967 TUTOMU HANAFUSA 3,317,866
AUTOMATIC CIRCUIT INTERRUPTER HAVING MAGNETIC BLOWOFF MEANS
Filed Jan. 31, 1964 8 Sheets-Sheet 4

Tutomu Hanafusa
Inventor
By Wenderoth, Lind and Ponack,
Attorneys

May 2, 1967 TUTOMU HANAFUSA 3,317,866

AUTOMATIC CIRCUIT INTERRUPTER HAVING MAGNETIC BLOWOFF MEANS

Filed Jan. 31, 1964 8 Sheets-Sheet 5

Tutomu Hanafusa
Inventor

By Wenderoth, Lind and Ponack,
attorneys

INVENTOR
TUTOMU HANAFUSA

BY Wenderoth, Lind & Ponack
ATTORNEYS

AUTOMATIC CIRCUIT INTERRUPTER HAVING MAGNETIC BLOWOFF MEANS

Filed Jan. 31, 1964

Tutomu Hanafusa
Inventor

By Wenderoth, Lind and Ponack
attorneys

Tutomu Hanafusa
Inventor
By Wenderoth, Lind and Ponack
attys.

United States Patent Office 3,317,866

Patented May 2, 1967

3,317,866

AUTOMATIC CIRCUIT INTERRUPTER HAVING MAGNETIC BLOWOFF MEANS

Tutomu Hanafusa, Osaka, Japan, assignor to Terasaki Denki Sangyo Kabushiki-Kaisha, Osaka, Japan Filed Jan. 31, 1964, Ser. No. 341,585
Claims priority, application Japan, Feb. 7, 1963, 38/4,815; Feb. 20, 1963, 38/7,404; June 17, 1963, 38/30,699, 38/30,700; July 30, 1963, 38/39,864
10 Claims. (Cl. 335—16)

This invention relates generally to a circuit interrupter and more particularly to a circuit interrupter of the type wherein the interrupting time is decreased upon occurrence of a current due to shortcircuiting of the associated circuit.

In general, if an opening time or an interval of time between the occurrence of a current such as shortcircuiting current and opening of the contact members of a circuit interrupter decreases this results in limitation of a shortcircuiting current flowing through the interrupter and accordingly through the associated circuit. This limitation of shortcircuiting current leads to advantages such as an increase in the interrupting capacity of the circuit interrupter per se and improvements in the flexibility of the interrupter to protect the protected devices.

In any of the existing electric distribution systems it will be foreseen that an overload current may occur in the system the maximum magnitude of which far exceeds an interrupting capacity of any low voltage circuit interrupter present in the distribution system. Under these circumstances, an arrangement comprising a circuit interrupter and a current limiting power fuse cascaded with the same can be used and indeed a circuit breaker device including a circuit interrupter and a current limiting power fuse incorporated integrally into the same has been employed. Such a device, however, is inevitably cumbersome because of the use of the current limiting fuse and also disadvantageous because of its cost of production. It is desirable to develop a simple and relatively inexpensive circuit interrupter of the type such as the fuse-less-type having an interrupting capacity increased to three or four times the present standard interrupting capacity. The development of such an interrupter will result in a great reduction in the costs of equipment for electric distribution systems.

Accordingly a general object of the invention is to increase an interrupting capacity of a circuit interrupter in a simple and inexpensive manner.

The principal object of the invention is to provide an improved circuit interrupter capable of interrupting shortcircuiting currents within an extremely short interval of time.

An object of the invention is to provide an improved circuit interrupter including a tripping mechanism relatively simple in construction and smooth in operation.

Another object of the invention is to provide an improved circuit interrupter having a simple construction wherein shortcircuiting currents are interrupted and that is immediately followed by freeing of a switch mechanism from its closed position.

According to the teachings of the invention, there is provided a circuit interrupter comprising a pair of relatively movable contact arm members carrying at the free ends respective contacts, either of the contact arm members when in its closed position including at least one portion thereof disposed substantially parallel to and slightly spaced from the other contact arm member. Upon the occurrence of a shortcircuiting current, the pair of contacts are immediately separated from each other by the action of an electromagnetic repulsion generated between those portions of the contact arm members parallel to each other due to the shortcircuiting current flowing therethrough in the opposite directions.

The invention and manner of operation to achieve the above and other objects and advantages thereof will become more readily apparent from the following detailed description taken in conjunction with the accompanying drawings in which.

Figure 15:
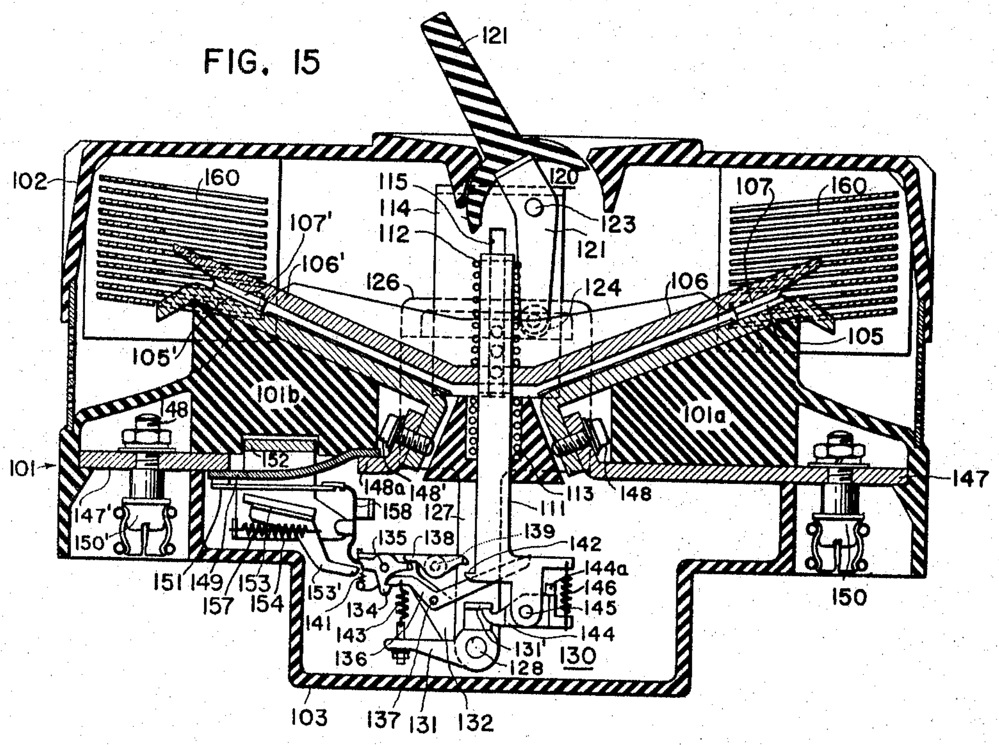
FIG. 15 is a side elevational view in section of a three pole type circuit interrupter according to a modification of the invention.
Figure 17:
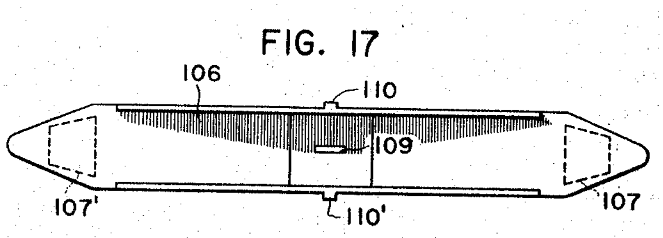
Figure 18:
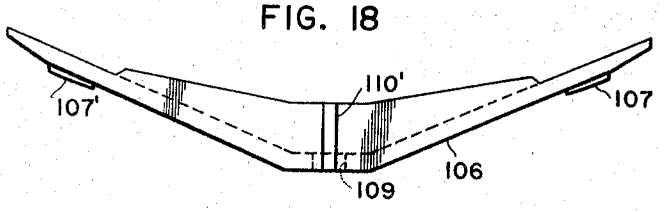
Figure 15A:
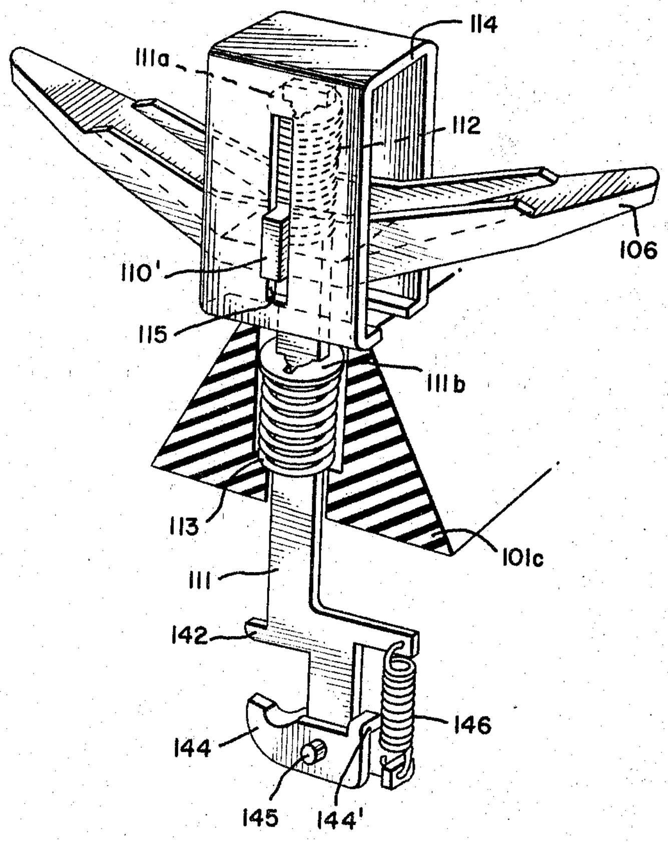
Figure 16:
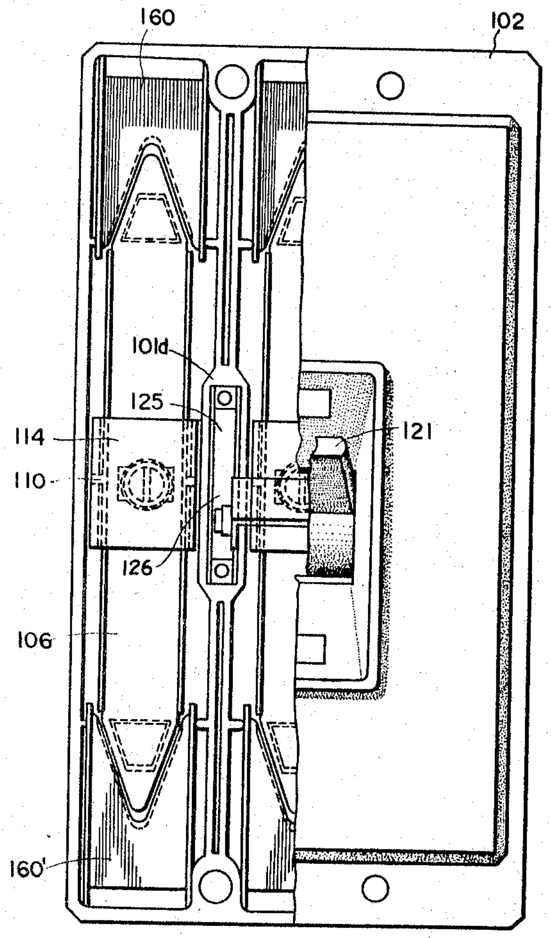
Figure 21:
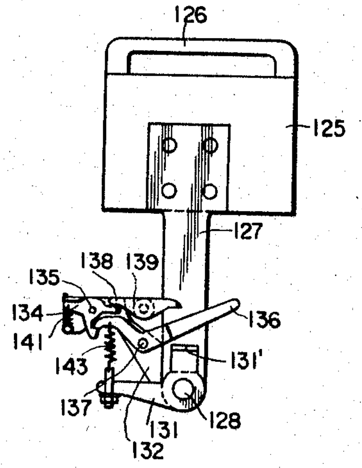
Figure 22:
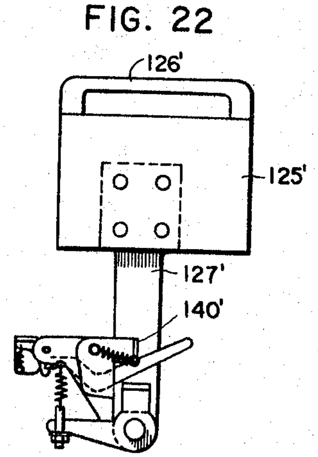
Figures 19, 20:
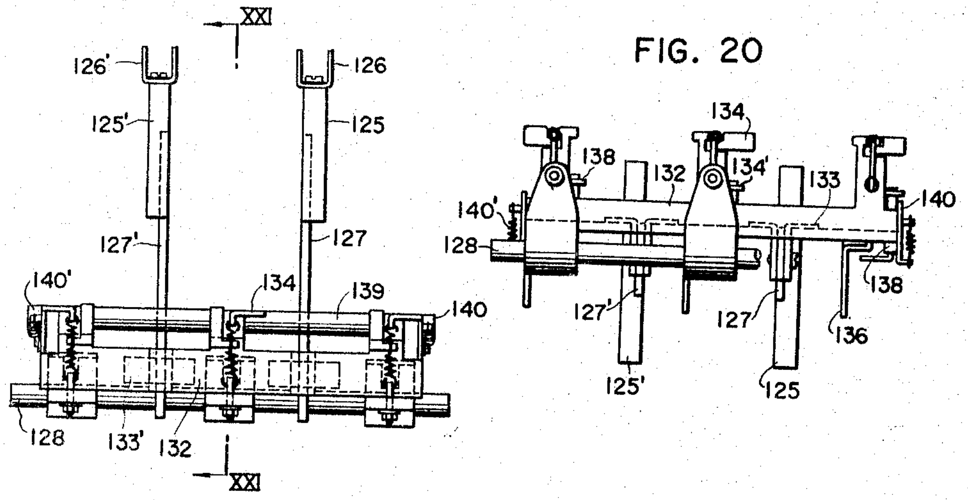
Figure 23:
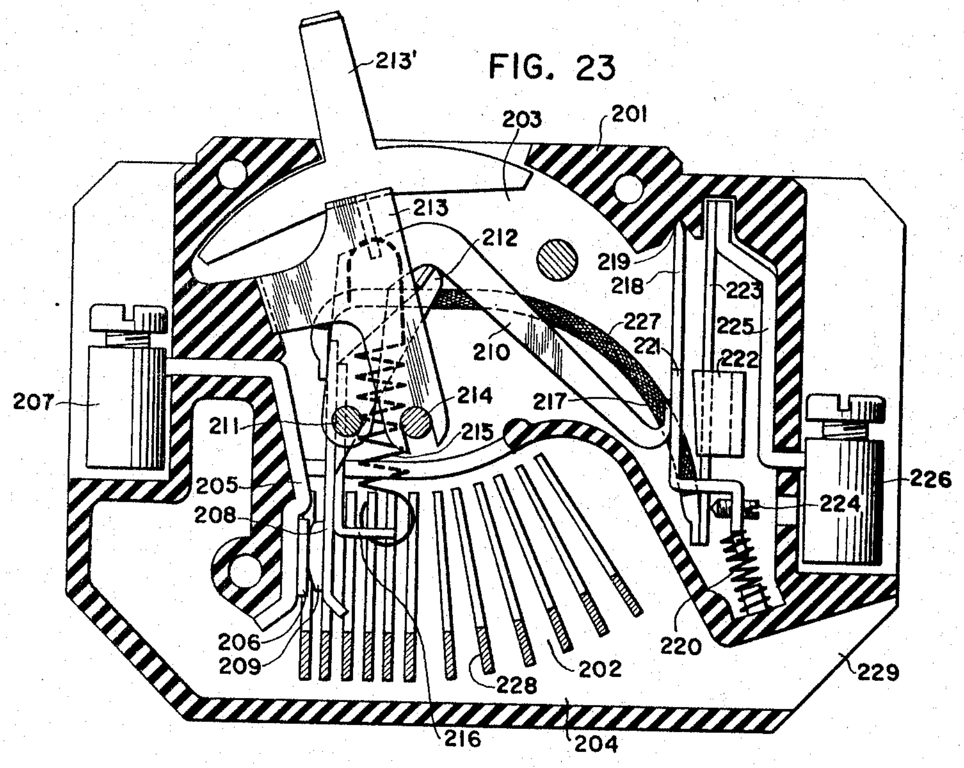

FIG. 15*a* is a perspective view of a part thereof;

FIG. 16 is a plan view of the circuit interrupter illustrated in FIG. 15; with a portion of a cover broken away to clearly illustrate the internal construction;

FIG. 17 is a bottom view of a movable contact arm used in the interrupter illustrated in FIGS. 15 and 16;

FIG. 18 is an elevational view of the movable contact arm illustrated in FIG. 17;

FIG. 19 is an elevational view of a tripping mechanism used in the circuit interrupter illustrated in FIGS. 15 and 16;

FIG. 20 is a bottom view of the arrangement illustrated in FIG. 19;

FIG. 21 is a section taken along the line XXI—XXI of FIG. 19;

FIG. 22 is a side elevational view of the arrangement of FIG. 19 as viewed from the right of FIG. 19; and FIG. 23 is a side elevational view of a single pole type circuit interrupter according to another modification of the invention with a cover omitted.

Figure 1:
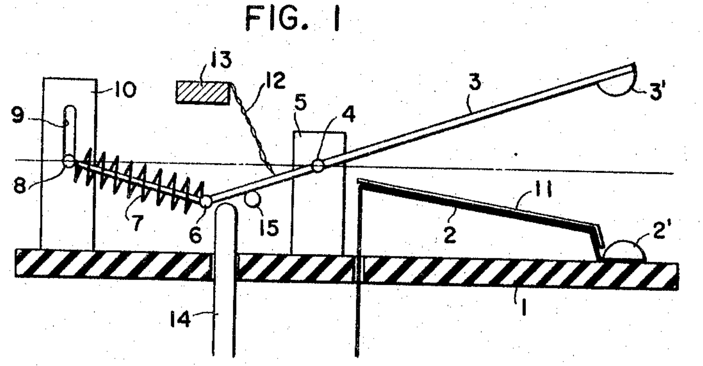
FIG. 1 is a schematic and elevational view, partly in section of a basic construction embodying the principle of the invention, the construction being illustrated at its open position.
Figure 2:
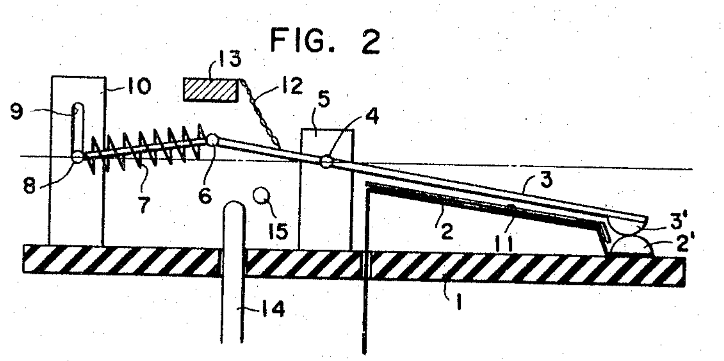
FIG. 2 is a view similar to FIG. 1 but illustrating the construction of FIG. 1 at its closed position.
Figure 3:
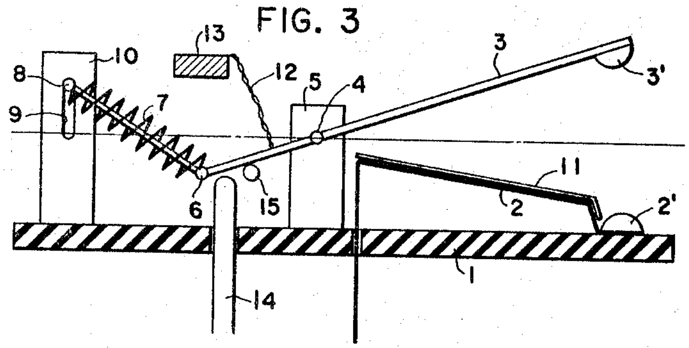
FIG. 3 is a view similar to FIG. 1 but illustrating the construction of FIG. 1 at its tripped position.

Referring now to FIGS. 1 through 3 of the drawings, there is illustrated a basic construction embodying the principle of the invention. The construction illustrated comprises a base plate 1 of any suitable, electrically insulating material and a stationary contact arm 2 of any suitable, electrically conducting material rigidly secured to the base plate 1. The stationary contact arm 2 carries at one end a stationary contact 2' and has the other end portion sealed through the base plate 1. Thus the stationary contact arm 2 also serves as a source terminal member. A movable contact arm 3 is pivotably mounted at its intermediate point to a pivot pin 4 disposed on an upright post 5 rigidly secured to the base plate 1. The movable contact arm 3 carries at one end a contact 3' adapted to engage the stationary contact 2' when the arm is in its closed position and includes the other end operatively connected at a connecting point 6 to one end of an operating helical spring 7. The spring 7 has the other end anchored on a movable pin 8 movable along a longitudinal slot 9 formed in an upright support member 10 rigidly secured to the base plate 1. If desired, a strip of any suitable resilient sheet may be used in place of the helical spring 7.

According to the teachings of the invention at least one portion of the movable contact arm 3 when in its closed position is arranged to extend substantially parallel to the stationary contact arm 2 and slightly spaced from the same. To improve insulation between both arms except for their contacts an electrically insulating coating 11 may be applied to that face of the stationary contact arm 2 facing the movable contact arm 3.

As shown in FIGS. 1 through 3, the movable contact arm 3 is connected through a flexible conductor 12 to a load terminal member 13 suitably mounted on the base plate 1. In order to operate the movable contact arm 3 an operating rod 14 adapted to be controlled by any suitable operating handle (not shown) loosely extends through a hole in the base plate 1 until its extremity is normally positioned in the vicinity of the movable contact arm 3 when in the open position. A stop 15 is provided for limiting the opening stroke or determining the open position of the movable contact arm 3. At this position, the movable pin 8 is maintained at its lowermost position within the longitudinal slot 9 as shown in FIG. 1 by any suitable means (not shown).

The arrangement thus far described is operated as follows: When the arrangement is in its open position as illustrated in FIG. 1, the connecting point 6 of the movable contact arm 3 and the operating spring 7 is below a dead center line for the spring designated by dotted line XX passing through the movable pin 8 and the pivot pin 4. In order to close the device, the operating rod 14 can be moved upwardly as viewed in FIG. 1 to swing the movable contact arm 3 about the pivot pin 4 in the clockwise direction as viewed in FIG. 1. Immediately after the connecting point 6 has passed the aforesaid dead center line, the action of the helical spring 7 is reversed in direction whereby the movable contact arm 3 is moved toward the stationary arm 2 with a snap action until the movable contact 3' is brought in contact with the stationary contact 2' under a suitable contact pressure (see FIG. 2). It is to be noted that, after the device has been closed that the operating rod 14 is returned to its original position in order to allow tripping of the device.

If it is desired to effect opening of the dveice then the operating rod 14 may be actuated to move downwardly the lefthand end of the movable contact arm 3 as viewed in FIGS. 1 through 3 to move the connecting point 6 of the movable contact arms 3 and the operating spring 7 below abovementioned dead center line to thereby reverse the direction of action of the spring 7 on the movable arm 3 whereupon the spring acts to separate the arm 3 from the arm 2 with a snap action.

For an overload current above a predetermined value corresponding to the magnitude of its rated current, the device may perform an automatic trip operation such that electromagnetically or thermally responsive means or the like (not shown) respond to such an overload current to release the movable pin 8 to permit the same to move upwardly to separate the movable contact 3' from the stationary contact 2' (see FIG. 3). After the completion of the trip operation the movable pin 8 is reset to its position as illustrated in FIG. 1.

Assuming that an excessive current such as a short-circuiting current flows through the device, it will be appreciated that the current flows through the movable and stationary contact arms 3 and 2 substantially parallel to each other, in the opposite directions, to generate a force due to electromagnetic repulsion between both arms. This electromagnetic repulsion causes the movable contact 3' to be separated from the stationary contact 2' and to move the connecting point 6 of the movable arm 3 and the operating spring 7 to be moved below the dead center line to reverse the direction of action of the helical spring 7 on the arm 3 whereupon opening is performed with a snap action. It has been found that the interrupting time is greatly reduced to from three to five tenths of one cycle of alternating current. Thus the invention can attenuate and cut off short circuiting currents as do current limiting fuses. This permits the interrupting capacity to be greatly increased.

Referring now to FIGS. 4 through 14 of the drawings, there is illustrated in a single pole double contact interruption type circuit interrupter constructed in accordance with the teachings of the invention. The interrupter illustrated includes a housing 20 having vertical and horizontal partitions and a detachable cover 21 therefor to form an enclosure for the interrupter. The housing and the cover may be molded from any suitable, electrically insulating plastic material. Disposed within the enclosure are a pair of interrupting units of similar construction in mirror-image relationship. Only one of the interruption units, for example, the righthand unit will now be described in detail and the components of the other unit corresponding to those of the one unit are designated by the same reference numerals primed.

The interruption unit disposed on the righthand portion of the enclosure includes a pair of stationary and movable contact arms 22 and 23 made of any suitable, electionary contact arm 22 extends upwardly through the 22 is suitably secured to a horizontal partition 24 (as viewed in FIG. 4) of the housing 20 and carries at its free end a contact 22c. The other end portion of the stationary contact arm 22 extetnds upwardly through the horizontal partition 24 and is electrically connected through an electrically conducting strip 25 to a terminal structure 26 disposed on one side of the housing 20.

Figures 8, 10:
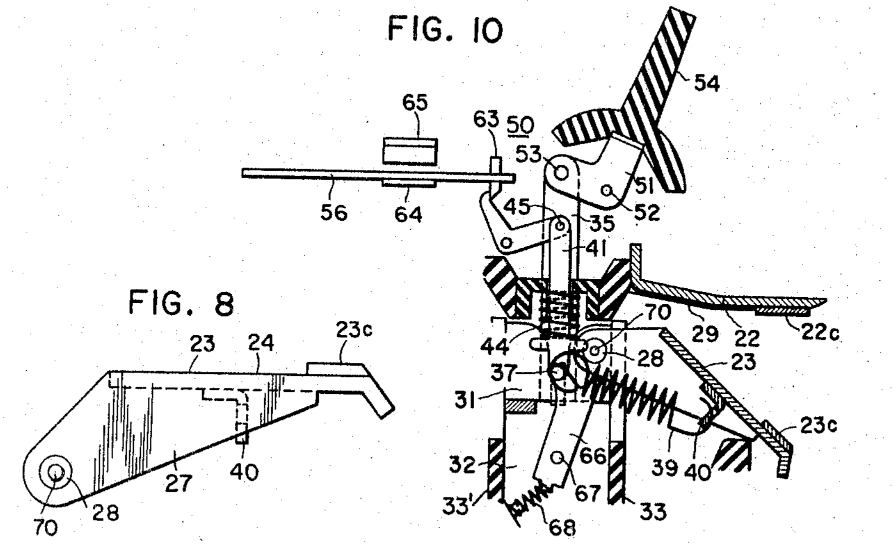
FIG. 8 is an elevational view of one of the movable contact arms illustrated in FIGS. 6 and 7.
FIG. 10 is a side elevational view, partly in section of a pair of stationary and movable contact arms, a tripping device and an operating device at the "OFF" position with another pair of stationary and movable contact arms omitted for purposes of clarity.
Figures 9, 11:
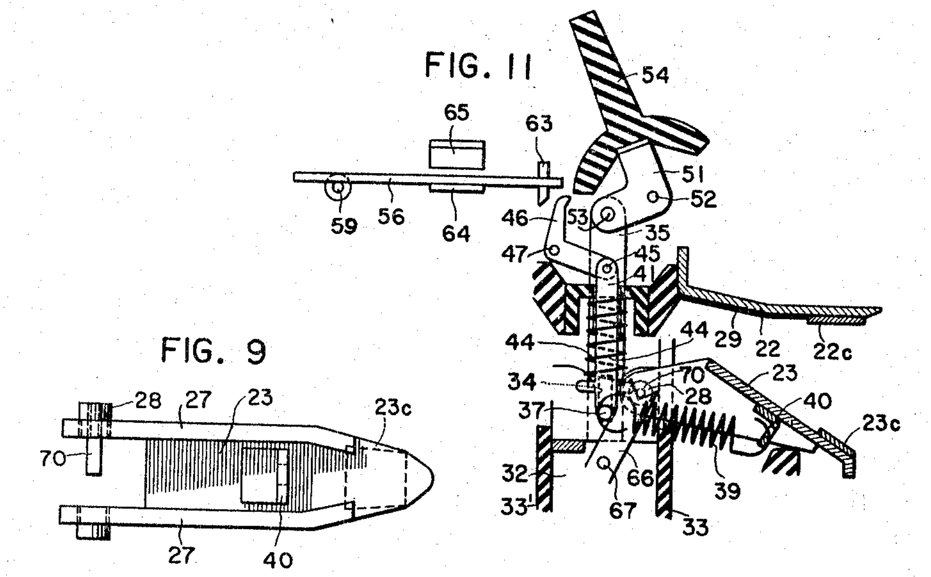
FIG. 9 is a bottom view of the movable contact arm illustrated in FIG. 8.
FIG. 11 is a view similar to FIG. 10 but illustrating the arrangement of FIG. 10 at its tripped position after thermal and electromagnetic trip means have been operated.

The movable contact arm 23 carries at its free end a contact 23c capable of engaging the associated stationary contact 22c when the arm is in its closed position and includes a pair of side extensions 27 integral with the main body of the contact arm and projecting downwardly and inwardly into an approximately triangular shape, as clearly shown in FIG. 8. The triangles 27 are provided adjacent the apices with a pair of aligned trunnions 28 adapted to rotatably engage a component of a tripping mechanism as will be described later, for the purpose of permitting the movable contact arm to turn about the common axis of the trunnions.

It is to be noted that, as in FIGS. 1 through 3 one portion of the stationary contact arm 22 is disposed parallel to the movable contact arm 23 at its closed position.

To improve the electrical insulation between the two contact arms 22 and 23 except for the contacts 22c and 23c an electrically insulating layer 29 may be disposed on that surface of the stationary contact arm 22 facing the movable contact arm 23, for example as by applying any suitable insulating varnish on that surface.

In order to simultaneously operate the righthand and lefthand movable contact arms 23 and 23', a common switching device is disposed centrally in the enclosure consisting of the housing 20 and the cover 21. The switching device generally designated by the reference numeral 30 includes a vertically movable U-shaped support slide 31 of any suitable, electrically conducting material slidable along a central guiding channel 32 defined by a pair of vertical partitions 33 and 33′ disposed in spaced, parallel relationship and integral with the housing 20. The supporting slide 31 is provided on either edge of each leg with a notch 34 or 34′ such that a pair of aligned notches on each side journal respectively the aligned trunnions 28 or 28′ on the movable contact arm 23 or 23′ to permit the arm to swing about the common axis of the trunnions (see FIG. 6).

Figure 6:
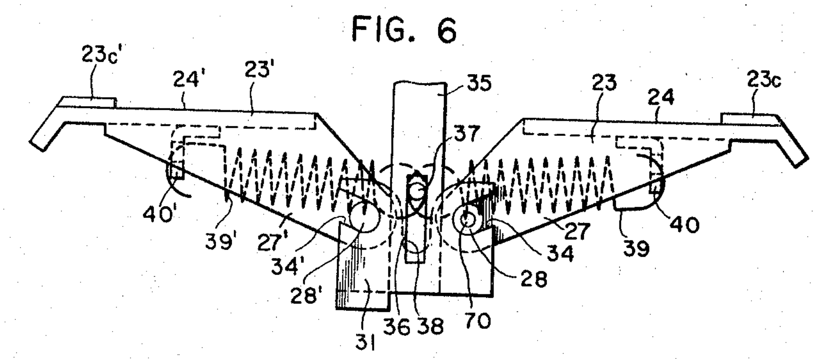
FIG. 6 is an elevational view of movable contact arms and the adjacent portion of a switch rod for opening and closing the same.
Figure 7:
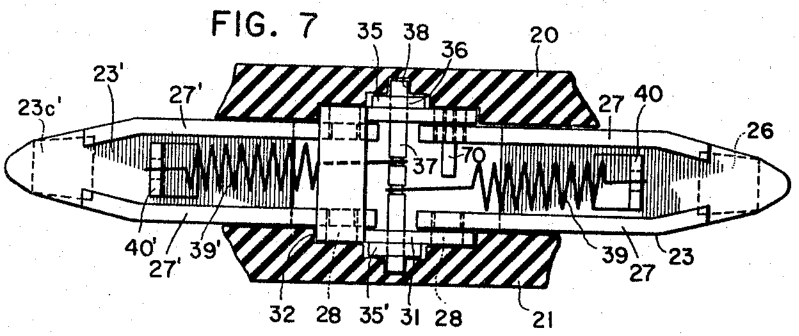
FIG. 7 is a plan view of the arrangement of FIG. 6 as viewed from bottom and illustrating in section a portion of each of a housing and a cover therefor.

A pair of switching strips 35 and 35′ extends along the opposed inner surfaces of the housing 20 and the assembled cover 21 respectively and the lower portions of the same are attached to the outer surfaces of the two legs of the U-shaped slide 31. The pair of switching strips 35 and 35′ have formed in the lower portions thereof a pair of aligned longitudinal slots 36 through which extends a substantially horizontal tripping pin 37 the ends of which can slide in longitudinally elongated grooves 38 disposed in aligned relationship on the opposed inner surfaces of the housing 20 and the assembled cover 21. In order for the tripping pin 37 to be freely movable in the vertical direction within the slots 36, each leg of the U-shaped slide 31 is shaped as best shown in FIG. 6.

In order to move the movable contact arm 23 away from the stationary contact arm 22 with snap action, a helical snap spring 39 is provided having one end anchored on the middle portion of the tripping pin 37 and the other end anchored to an L-shaped lug 40 rigidly secured to the movable contact arm 23 on the lower surface.

To actuate the tripping pin 37, a vertically movable rod 41 vertically extends through an opening 42 formed in the horizontal partition 24 at its center, and includes a pair of radially opposed projections 43 provided on the lower end portion for seating a tripping spring 44 having the other end abutting against the lower surface of the partition 24 around the opening 42. The tripping spring 44 surrounds the rod 41 and tends to normally move the rod downwardly. The rod 41 has its lower end capable of contacting the tripping pin 37 when the same is in its reset position and has its upper end operatively connected at a pivot 45 to a tripping lever 46 of the bell crank type pivotably mounted on a pivot stem 47 suitably secured to the housing 20.

To manually actuate the switching device 30 an operating device generally designated by the reference numeral 50 includes a pair of switching strips 35 as above described, an operating member 51 of U-shaped cross section pivotably mounted on a pivot stem 52 disposed on the housing 20 and having a forked end portion operatively connected to switching strips 35 through a connecting pin 53, and a manually operated insulating handle 54 integral with the operating member 51 and projecting beyond the top surface of the housing 20.

In order for the circuit interrupter to be automatically and instantaneously responsive to overload currents which are below a predetermined value corresponding to approximately fifty or sixty times its rated current capacity, automatic trip means are incorporated into one of the interruption units. In the example illustrated, automatic trip means generally designated by the reference numeral 55 are incorporated into the lefthand interruption unit and include a thermally responsive element which is illustrated as a bimetal element 56 electrically connected through flexible conductors 57 and 58 to the stationary contact arm 22′ and an electrically conducting strip 25′ respectively. The bimetal element 56 includes a supporting pin 59 secured to that end portion thereof near the flexible conductor 58 and rotatably fitted into aligned supporting holes (not shown) provided on the housing 20 and the associated cover 21 respectively. Thus the bimetal element 56 is pivotable about the axis of the supporting pin 59. To normally bias the bimetal element 56 in the clockwise direction as viewed in FIG. 4, a trip resetting spring 60 is coupled at one end to the bimetal element 56 between that end thereof connected to the flexible conductor 58 and the supporting pin 59 and seats in a holding recess 61 in the partition 24. In order to normally maintain the bimetal element 56 at its predetermined position against the action of the spring 60, a stop 62 is disposed on the same side of the bimetal element as the resetting spring and near the middle of the bimetal element. Further the bimetal element 56 includes disposed at the free end an adjustable detent 63 which, in turn, normally engages the tripping lever 46 at the free end. The bimetal element 56 is adapted to be heated by flow of current therethrough and provides slow tripping means.

Further, the bimetal element 56 has a movable iron core 64 rigidly secured thereto, in this case, immediately above the stop 62. Also a stationary armature 65 of magnetic material is suitably secured to the housing 20 directly above the movable iron core 64 with the legs of the armature facing the bimetal element 56 and hence the movable iron core 64. The bimetal element 56, the movable iron core 64 and the armature 65 provide a tripping electromagnet with the armature and stop serving to limit rocking movement of the bimetal element.

The conducting strip 25′ is connected to a terminal structure 26′ identical with the terminal structure 26. The terminal structures 26 and 26′ serve to electrically connect the circuit interrupter into the associated circuit.

Figure 4:
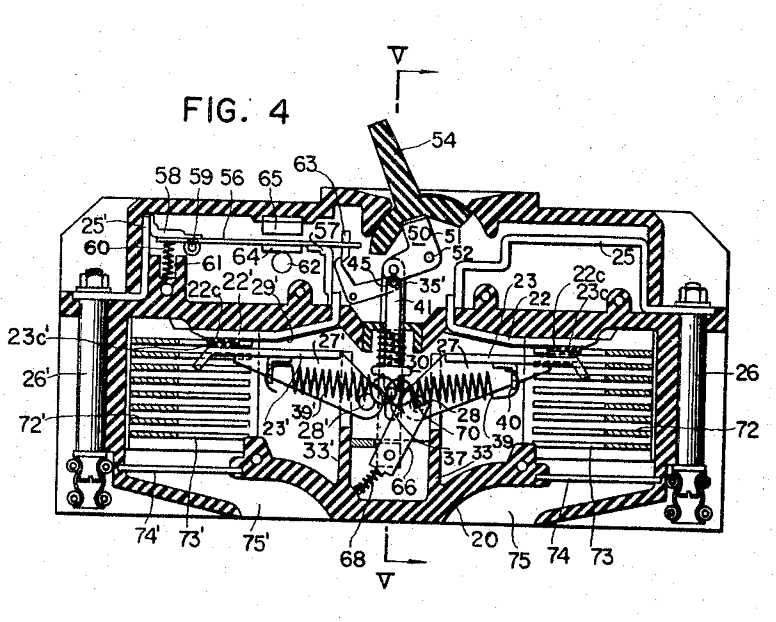
FIG. 4 is a side elevational view in section of a single pole type circuit interrupter constructed in accordance with the teachings of the invention.
Figure 5:
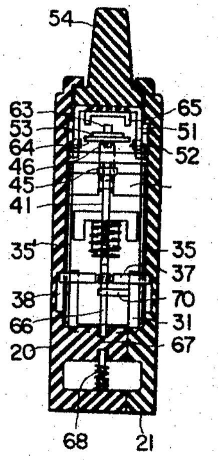
FIG. 5 is a section taken along the line V—V of FIG. 4.

As shown in FIGS. 4, 5 and 10–14, a locking or trip restraining lever 66 is pivotably supported on a horizontal supporting pin 67 on that portion of the housing 20 extending into the lower portion of the guiding channel 32 on its vertical central line and tends to be normally biased for rotation in the counterclockwise direction as viewed in FIG. 4 by spring 68 disposed between the lower side of the lever and the bottom of the channel. The lever 67 is provided at the upper free edge with a concave or bight portion 69 adapted to engage a trip releasing pin 70 screwed into one of the trunnions 28 on the movable contact arm 23 and at the lefthand corner as viewed in FIG. 4 with a recess 71 adapted to engage the tripping pin 37. The releasing pin 70 is moved as the slide 31 slides within the guiding channel 32.

Each of the interruption units further includes an arc extinguishing spaces 72 or 72′ including therein V-shaped arc extinguishing plates 73 or 73′ disposed in spaced parallel relationship and communicating with the exterior of the interrupter through a perforated barrier 74 or 74′ and a vent 75 or 75′.

Figure 13:
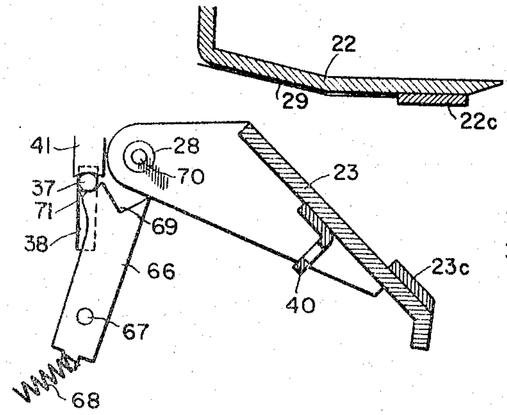
FIGS. 13 and 14 show a portion of the arrangement shown in FIGS. 10 through 12 and at its "OFF" and "ON" positions respectively.

With the circuit interrupter at its "OFF" position illustrated in FIG. 10, the operating handle 54 has been thrown to the right side as viewed in FIG. 10, and the tripping pin 37 rests in the recess 71 on the trip restraining lever 66 to thereby prevent the tripping pin 37 from moving downwardly by the action of the operating spring 39 through the rod 41 (also see FIG. 13).

If the handle 54 is then thrown to its "ON" position or to the left side, the operating member 51 moves the slide 31 downwardly along the vertical guiding channel 32 through the switching strips 35. This downward movement of the slide 31 is accompanied by engagement of trip releasing pin 70 with the trip restraining lever 66 in the notch 69. This causes the restraining lever 66 to rotate in the clockwise direction.

Figure 14:
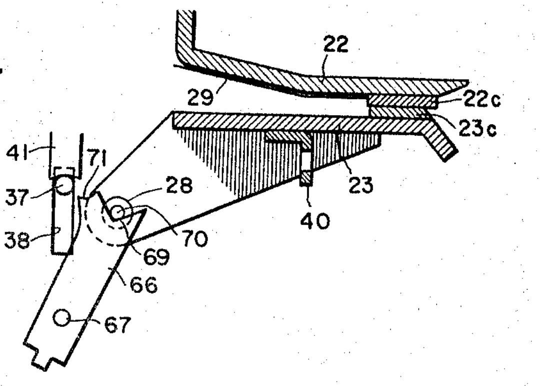

The slide 31, the trunnions 28 and 28′, and the releasing pin 70 are further moved downwardly until the forces exerted by the operating springs 39 and 39′ on the movable contact arms 23 and 23′ are reversed in direction whereupon the movable contact arms 23 and 23′ will perform the making operation. At that instant the movable contacts 23c and 23c′ are put in contact with the stationary contacts 22c and 22c′ respectively and the tripping pin 37 disengages from the recess 71 at the free end of the restraining lever 66 to be permitted to move upwardly by the action of the operating springs 39 and 39'. Thus the interrupter is brought into its closed position as illustrated in FIG. 4 and the tripping pin 37, the trip releasing pin 70 and the trip restraining pin 66 occupy their respective positions as illustrated in FIG. 14 with the operating springs 39 exerting the upwardly directed forces on the tripping pin 37.

In summary, the circuit interrupter of the invention can be manually opened and closed by manually turning the operating handle 54 to operate the operating device 50 to thereby move vertically the switching levers 35 and 35', the slide 31 and the trunnions 30 and 30'. The vertical movement of the trunnions 30 and 30' varies the fulcra of the movable contact arms 23 and 23' to effect opening and closing of the movable contact 23*c* and 23*c*' with respect to the stationary contacts 22*c* and 22*c*' respectively.

It is now assumed that, with the interrupter at its closed position, an overload current below the predetermined value as previously mentioned flows through the interrupter. It is understood that the operating handle 54 remains in its "ON" position. However, the bimetal element 56 providing the slow tripping means and the fast tripping electromagnet 56, 64, 65 respond to such an overload current whereby the bimetal element 56 is bent upwardly to disengage the detent 63 secured at its free end from the tripping lever 46 thereby permitting the same to rotate in the clockwise direction as viewed in FIG. 10. Thus the tripping spring 44 will longitudinally expand to rapidly move the tripping rod 41 and the tripping pin 37 in the downward direction. The downward movement of the tripping pin 37 causes downward movement of that end of the operating springs 39 and 39' attached to the pin 37 until the force exerted by each of springs 39 or 39' on the associated movable contact arms 23 or 23' is reversed in direction. At that time, each of the movable contacts 23*c* or 23*c*' is separated from the associated stationary contacts 22*c* and 22*c*' with a snap action to complete interruption of the overload current (see FIG. 11).

Under these circumstances, the handle 54 can be thrown from its "ON" position to its "OFF" position to reset the interrupter. More specifically, turning of the handle 54 from its "ON" position to its "OFF" position causes rotational movement of the operating member 51 about the pivot 52 and thereby causes upward movement of the switching strips 35, 35' and the slide 31 to move the tripping pin 37 upwardly to its uppermost position and simultaneously to rotate the tripping lever 46 in the counterclockwise direction as viewed in FIG. 10 through the upward movement of the tripping rod 41 until the free end of the lever 46 forcibly engages the detent 63 on the bimetal element 56. Thus the interrupter is reset to its "OFF" position as illustrated in FIG. 10.

If, with the interrupter at its "ON" position, an excessive current such as a shortcircuiting current flows through the interrupter, before the bimetal element 56 and the electromagnet 61, 62 will have responded to the excessive current, an electromagnetic repulsion is established between those portions of the stationary and movable contact arms 22 and 23 or 22' and 23' parallel to each other through the flows of excessive current through the arms in the opposite directions with the force of repulsion prevailing over the force exerted by the operating spring 39 or 39' on the respective movable contact arm 23 or 23' to maintain the same its closed position. The electromagnetic force thus established serves to separate each movable contact from the respective stationary contact.

Figure 12:
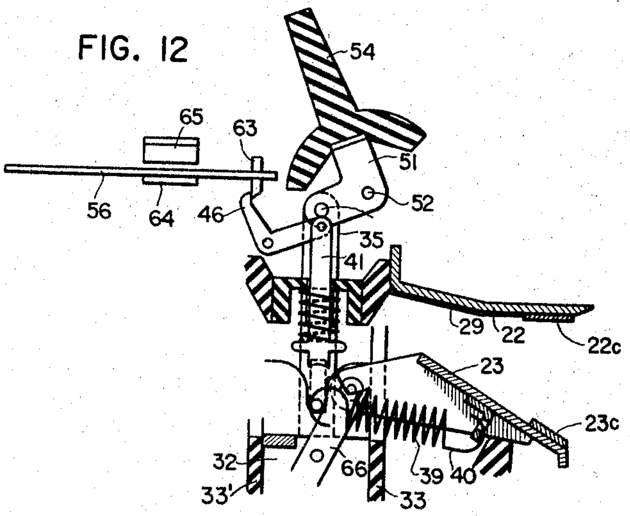
FIG. 12 is a view similar to FIG. 10 but illustrating the arrangement of FIG. 10 at its tripped position due to a flow of shortcircuiting current.

At the same time, the lug 40 secured on each movable contact arm and hence the junction of the associated spring 39 and that movable contact arm reaches a level below the level at which the tripping pin 37 is disposed in in the closed position of the movable contacts whereby the operating springs 39 and 39' apply the forces in the reverse direction to the tripping pin 37. Therefore, the pin 37 moves downwardly along the groove 38 until it reaches its position lower in level than that of the common axis of each pair of trunnions 28. Thereupon the forces exerted by the operating springs 39 and 39' on the respective movable contact arms 23 and 23' are reversed in direction to maintain these arms in their open position. This is illustrated in FIG. 12.

From the foregoing it will be appreciated that, upon the occurrence of an excessive current such as a shortcircuiting current, the circuit interrupter of the invention is operated to separate the movable contact per se from the stationary contact by the action of electromagnetic repulsion generated between the movable and stationary contact arms independently of the operation of thermal and electromagnetic trip means with the result that the interrupting time is greatly reduced as compared with the conventional type of circuit interrupters. In the conventional type of interrupters, thermal and electromagnetic trip means have been first operated to release a switching mechanism and then the released switching mechanism is operated to disengage a movable contact from a stationary contact.

Referring now to FIGS. 15 through 22 of the drawings, there is illustrated a three pole type circuit interrupter constructed in accordance with a modification of the invention. The arrangement illustrated comprises a housing generally designated by the reference numeral 101, a detachable top cover 102 and a detachable bottom cover 103 to form an enclosure adapted to accommodate three interruption units, one for each pole. The housing 101 and the top and bottom covers 101 and 102 may be made of any suitable, electrically insulating plastic material by a molding process. The housing 101 includes therein a pair of opposed insulating blocks 101*a* and 101*b* serving as supports for stationary contact arms and an insulating block 101*c* of truncated triangular cross-section positioned in a space between the opposed blocks 101*a* and 101*b* and serving as a support for an interrupting spring for each pole. The housing also includes a vertical insulating partition 101*d* formed between a pair of adjacent interruption units.

Each interruption unit comprises a pair of stationary contact arms 104 rigidly secured on the respective blocks 101*a* and 101*b* in opposed, symmetrical relationship and each having at the free end a contact 105. A single movable contact arm 106 of V-shaped longitudinal section is movably disposed substantially parallel to the pair of stationary contact arms 104. The movable contact arm 106 includes at both free ends a pair of contacts 107 respectively capable of engaging the associated stationary contacts 105 when the movable contact arm is in its closed position. In order to improve the electric insulation between the stationary and movable contact arms except for their contacts an electrically insulating layer or coating 108 may be applied on that surface of each stationary contact arm 104 facing the movable contact arm 106. From FIG. 15 it is to be noted that the movable contact arm 106 is shaped and arranged such that, in its closed position, each of the legs of the V-shaped arm is substantially parallel to the associated stationary contact arm 104 and slightly spaced from the same.

As shown in FIGS. 17 and 18, the movable V-shaped contact arm 106 is provided in the bottom with an elongated rectangular aperture 109 and also on both sides of the bottom with a pair of protrusions 110 aligned with the center of the aperture 109. For engaging the movable contact 107 with and disengaging it from the stationary contact 105, a vertical switching rod 111 of rectangular cross section is inserted into the aperture 109 in the movable contact arm 166 for vertical movement. The switching rod 111 is provided on the upper end portion with a circular stop 111*a*, seen in FIG. 15*a* and a pressing spring 112 is disposed between the latter and the movable contact arm 107. On the intermediate portion is a stop 111*b*, also shown in FIG. 15*a*, for an interrupting spring 113. The switching rod 111 extends through the pressing spring 112, the movable contact arm 106, the stop 111*b*, the interrupting spring 113 and a supporting block 101*c* in the named order from the top. Further a U-shaped stationary guiding frame 114 is disposed so as to embrace the upper portion of switch rod 111 with the pressing spring 112 and is fixed to the supporting block 101*c*. The frame 114 has formed in the leg thereof a pair of vertical guiding grooves 115 into which the lateral protrusions 110 on the movable contact arm 106 are slidably positioned for the purpose of effecting controlled vertical movement of the movable contact arm 106. The pressing spring 112 disposed between the stop 111*a* and the movable contact arm 106 serves to exert a contact pressure upon the movable contacts 107 and 107′ when the latter engage the stationary contacts 105 and 105′ and to press the movable contact arm 106 against the lower stop 111*b* during disengagement of the contacts. On the other hand, the interrupting spring 113 is disposed between the lower stop 111*b* and the upper enlarged portion of the opening in the block 101*c* and serves normally to bias the switching rod in the upward direction. The movable contact arm 106 may be preferably an aluminum casting.

A single operating device is provided to manually effect simultaneous opening and closing of three pairs of the movable and stationary contacts. The operating device generally designated by the reference numeral 120 comprises an operating handle 121 of any suitable, electrically insulating matrial projecting from the central portion of the upper surface of the top cover 102, and an operating member 122 rigidly connected with the handle 121 and rotatably supported on a pivot pin 123 provided on the stationary frame 114 for the middle interruption unit. Thus the handle can be manually turned about the pivot pin 123 in either direction. The operating member 122 has a forked free end both legs of which are provided at the extremities with a pair of rollers 124 respectively.

Each partition 101*d* disposed on either side of the middle interruption unit has formed in its central thick portion a rectangular opening into which a rectangular guiding block 125 of a suitable, electrically insulating material is loosely inserted with the top surface provided with a guiding trough 126 along which the associated roller 124 is adapted to slide when the handle 121 is operating. The guiding block 125 forms a part of a switch actuating rod 127 extending downwardly between each pair of adjacent interruption units. As best shown in FIG. 21, each pair of the actuating rods 127 are connected at the lower end portions to an interlocking rod 128 substantially horizontally disposed and common to all the interruption units.

In order to transmit vertical movement of the actuating rods 127 to the switching rods 111 to effect closing and opening of the interruption units, a switching device generally designated by the reference numeral 130 includes one L-shaped lock lever 131 for each pole mounted on the interlocking rod 128 for counterclockwise rotation but against clockwise rotation as viewed in FIGS. 15, 21 and 22. Rigidly secured to both actuating rods 127 by L-shaped fixtures 133 is a horizontal support block 132 of any suitable, electrically insulating material with each rod connected to a pair of opposed L-shaped fixtures (see FIGS. 19 and 20). For each interruption unit the support block 132 includes an intermediate connecting detent lever 134 having three arms and pivotably mounted thereon at a pivot 135 and a resetting and balancing lever 136 pivotably mounted thereon on another pivot 137. Further one interlocking latch lever 138 for each interruption unit is rigidly secured on an interlocking trip rod 139 rotatably supported by a pair of bearing plates 140 disposed at both ends of the support block 132.

The intermediate connecting lever 134 includes a first arm engaging one end of the interlocking lever 138, a second arm normally engaging one end of the resetting and balancing lever 136 and a third arm operatively coupled to a spring 141 tending to rotate the lever 134 in the counterclockwise direction as viewed in FIGS. 15, 21 and 22. The other end of the interlocking lever when the circuit interrupter is in its normal position, is set to be capable of actuating the switching rod 111 through a projection 142 provided on the adjacent side thereof. The one end of the resetting lever 136 normally engaging the second arm of the lever 134 is operatively coupled to the L-shaped lock lever 131 through a balancing spring 143 having one end anchored at that one end of the lever and the other end coupled to one end of lock lever 131. Thus the spring 143 tends to normally rotate the lock lever 131 in the clockwise direction as viewed in FIGS. 15, 21 and 22.

A latch lever 144 is operatively connected to the switching rod 111 through a rotatable shaft 145 provided on the lower end portion of the rod 111 for clockwise rotation but against counterclockwise rotation as viewed in FIG. 15. The latch lever 144 has one end normally engaging the other end 131′ of the L-shaped lock lever 131 and the other end connected to one end of a tension spring 146. The other end of the spring 146 is connected to an appropriate portion of the switching rod 111.

As in the interrupter as previously described in conjunction with FIGS. 4 through 14, automatic trip means are incorporated into each of the three interruption units.

As shown in FIG. 15, the lefthand stationary contact arm 104 has the other end fastened by a fastening screw 148′ to an electrically conducting strip 148*a*, which, in turn, is connected through an electric resistance 149 to another electrically conducting strip 147′ connected to a terminal structure 150′. On the other hand, the righthand stationary contact arm 104 is connected at the other end to an electrically conducting strip 147 by a screw 148 and the latter strip is directly connected to another terminal structure 150. Both terminal structures have an identical construction and serve to electrically connect the associated interruption unit to an electric circuit.

The electric resistance 149 acts as a heater for a thermally responsive element such as a bimetal element 151 disposed below the same and forming a part of slow trip means as will be later described. The bimetal element 151 is disposed within an inverted U-shaped stationary magnet 152 secured to the insulating block 101*b* on the lower surface thereof and facing a movable iron core 153 with the bimetal element extending therebetween. The movable iron core 153 is pivotably mounted at one end to a holding plate 154 suitably secured to the housing 101. The magnet 152 and movable iron core 153 form a fast trip electromagnet. The movable iron core 153 includes a fast tripping element 153′ secured to its bottom and preferably made integral therewith with the free end normally disposed slightly below the third arm of the connecting detent lever 134 when the interruption unit is in its "ON" position. The movable iron core and the actuation element 153 and 153′ are normally biased in the clockwise direction as viewed in FIG. 15 by a spring 157 coupled to the element and the holder plate 154. The bimetal element 151 normally engages at the free end a slow tripping lever 158 rockably mounted at its fulcrum to the holder plate 154 and having one end capable of actuating the third arm of the connecting lever 134 when the element responds to an overload current.

Disposed adjacent each pair of the stationary and movable contacts 105 and 107 is an arc-extinguishing chamber 160.

The arrangement thus far described is operated as follows: Assuming that the circuit interrupter is in its open position all the movable components are put in their engaged state except for the fast and slow tripping elements 153 and 158. Under the circumstances, the operating handle 121 can be manually thrown to its "ON" position to rotate the operating member 122 about its pivot pin 123 to permit the rollers 124 to slide along the associated guiding troughs 126. This causes downward movement of the actuating rod and the associated components. It is recalled that the lever 131 and the latch lever 144 are prevented from rotating in the clockwise and counterclockwise directions as viewed in FIG. 15 respectively. Therefore, downward movement of the lever 131 causes downward movement of the latch lever 144 engaging the upper end thereof resulting in lowering of the switching rod 111. This lowering of the switching rod 111 causes compression of the interrupting spring 113 while causing downward movement of the movable contacts 107 and 107' through the pressing spring 112 until the contacts 107 and 107' are brought into engagement with the stationary contacts 105 and 105'. Thereafter a further downward movement of the switching rod 111 causes compression of the pressing spring 112. The compressed spring 112 acts to apply the contact pressure to the contacts 105, 105' and 107, 107'. In this way the interrupter is brought to and maintained in its closed position. In addition the connecting detent lever 134 for each unit is brought into its position near to the tripping elements 153' and 158 whereby the interrupter is ready for automatically interrupting any overload current which may occur in the associated electric circuit.

In the closed position, an upward force exerted upon the switching rod 111 by the pressing and interrupting springs 112 and 113 is transmitted to the actuating rod 127 and the guiding block 125 through the connection of the lock and latch levers 131 and 144 and tends to rotate the operating member 122 from its position illustrated in FIG. 15 in the counterclockwise direction as viewed in the same figure. However, the fact that lever 144 cannot rotate counterclockwise prevents such rotation of the operating member and the closed position is maintained.

Under these circumstances, all the engaging and engaged components are in a set state. If it is desired to open the interrupter the operating handle 121 can be manually turned into its OFF position in the counterclockwise direction as viewed in FIG. 15 to reverse the direction of the contact pressure and the interruption force exerted counterclockwise on the operating member 122 by the pressing and interrupting springs 112 and 113 to rotate the member 122 in the clockwise direction while at the same time effecting upward movement of the blocks 125 and 125', the rods 127 and 127', the lever 131, the latch lever 144, and the rods 111 and 111', resulting in the interrupter being started on the opening operation. Once the movable contacts 105 and 105' have been separated from the stationary contacts 107 and 107' during the upward movement just described, only the interrupting spring 113 functions to provide a force for effecting upward movement.

If, with the interrupter at its closed position, an ordinary overload current flows through at least one of the interruption units, then the bimetal element 151 incorporated into that interruption unit through which such an overload current flows is heated by a flow of current through the associated heater 149 to cause the slow tripping lever 158 to rotate the intermediate connecting detent lever 134 in the clockwise direction as viewed in FIG. 15 to thereby disengage the lever from the balancing lever 136. This rapidly reduces a force which the balancing spring 143 exerts downwardly through the lock lever 131 on a point at which the upper end 131' of the lock lever 131 engages the latch lever 141 to such an extent that the sum of upward forces exerted by the pressing and interrupting springs 112 and 113 on that engaged point through the switching rod 111 and the lever 141 prevails over the force due to the spring 143. Therefore, the latch lever 144 is operated to rotate the lock lever 131 in the counterclockwise direction as viewed in FIG. 15 to disengage from the lock lever whereby the switching rod 111 and hence the movable contact arm 106 can be forced upwardly by the action of the pressing and interrupting springs 112 and 113 to separate the movable contacts 107 and 107' from the stationary contacts 105 and 105'.

At the same time, upward movement of the switching rod 111 causes the projection 142 thereon to rotate the now engaged interlocking lever 138 and the interlocking rod 139 in the counterclockwise direction as viewed in FIGS. 15, 21 and 22. This rotational movement of the rod 139 causes the intermediate connecting detent levers 138 for the other units rigid with the rod to be rotated in the clockwise direction to disengage from the associated balancing levers 136 to thereby disengage the lock levers 131 from the latch levers 144 respectively. Thus it will be appreciated that, if the interruption unit for any one pole effects a tripping operation, this is accompanied by tripping operation of the interruption units for two other poles resulting in opening of the interrupter.

Further, if an overload current the magnitude of which goes as high as several thousand percent of the magnitude of the rated current flows through at least one of the interruption units, then the fast tripping electromagnet incorporated into that interruption unit through which such an overload current flows responds to that current to move the movable iron core 153 toward the stationary iron core 152 to thereby cause the fast tripping element 153' to rotate the connecting lever 134 in the clockwise direction as viewed in FIG. 15. Subsequently, a tripping operation similar to that above described in conjunction with the slow tripping lever 158 is performed until the interrupter is in its open position.

During the normal operation, the downward force of the balancing spring 143 on the engaging point of the levers 131 and 144 is higher than the sum of upward forces exerted by the pressing and interrupting springs 112 and 113 through the switching rod 111 on that engaging point to thereby maintain the lock lever 131 and the latch lever 144 in their engaged state as illustrated in FIG. 15.

If an excessive current such as a shortcircuiting current flows through at least one of the interruption units, such an excessive current flows through the associated stationary and movable contact arms 104 and 106 to generate between those portions of the arms parallel to each other an electromagnetic repulsion force which, in turn, is added to the upward forces due to the pressing and interrupting springs 112 and 113 whereby the lock lever 131 and the latch lever 144 will no longer be maintained in the engaged state as illustrated in FIG. 15. Therefore, the lever 144 rotates the lever 131 in the clockwise direction to disengage from the latter permitting the switching rod 111 and therefore the movable contact arm 106 to be upwardly moved at a high speed by the action of the pressing and interrupting springs plus the electromagnetic repulsion force now generated whereby the movable contacts are separated from the associated stationary contacts. It is to be understood that in the two remaining interruption units the opening operation is simultaneously performed. Thus the interrupter can effectively interrupt the shortcircuiting current within an extremely short interval of time.

After the interrupter has been placed in its tripped position the operating handle 121 can be manually thrown to its "OFF" position and then to its "ON" position to reclose the interrupter. Throwing of the handle from its "ON" position to its "OFF" position, causes upward movement of the actuation rods 127 whereby the resetting levers 134 abut at one end against the bottom surfaces of the supporting blocks 101*c* to rotate in the clockwise direction as viewed in FIG. 15 and engage at the other end the intermediate connecting levers 134. At the same time, the ends 131' of each of the lock levers 131 engages the latch levers 144 whereupon the resetting operating is completed. Then the handle 121 can be thrown to its "ON" position to reclose the interrupter.

From the foregoing, it will be appreciated that, upon the occurrence of a shortcircuiting current the electromagnetic repulsion force generated between those portions of the stationary and movable contact arms parallel to each other is applied to the latch lever 144 connected to the switching rod 111 as a force for releasing its locking engagement whereby the lever 144 disengages from the locking lever 131 to permit the movable contacts 107 to be separated rapidly from the associated stationary contact 105 by the action of the interrupting spring. This reduces the interrupting time ensuring both an increase in the interrupting capacity and more complete protection of the associated electric equipment.

In the circuit interrupter illustrated in FIGS. 15 through 22, a tripping mechanism is ultimately operated to disengage the switching rod 111 from the actuating rod 127. The actuating rod 127 is associated with the intermediate connecting detent lever 134, the resetting and balancing lever 136 and the interlocking lever 138 and arranged to move along with all these levers as a unit. Further the tripping mechanism is put in the engaged or reset state with respect to both the slow tripping lever 158 fixed in its closed position and the fast tripping element 153' fixed in the "ON" position. Therefore although hte tripping mechanism is of a multiple stage type the interrupter is not complicated in construction and is smooth in its tripping operation.

As previously explained, the movable switching rod 111 is physically disposed in parallel to the actuating rod 127 and can be operatively connected to the same through engagement of the latch lever 144 and the locking lever 131. However, both rods can be disconnected from each other in the tripped position. The operating handle 121 is manually operated to move both rods as a unit to thereby open and close the interrupter. Therefore, by properly disposing various detents or levers on the actuating rod 127 the interrupter can be freely tripped in a simple manner.

Referring now to FIG. 23, there is illustrated a single pole type circuit interrupter of relatively simple construction according to the teachings of the invention. The arrangement illustrated comprises an insulating housing 201 including a partition 202 dividing the same into an upper operating chamber 203 and a lower arc-extinguishing chamber 204. A stationary contact arm 205 extending into both chambers is suitably secured on one wall of the housing 201 and provided with a contact 206 at one end disposed in the arc-extinguishing chamber 204. The other end portion of the stationary contact arm 206 extends through the wall of the housing 201 and is connected to a terminal structure 207 secured on the outside of the housing. A movable contact arm 208 also extends into both chambers 203 and 204 in opposed relationship with respect to the stationary contact arm 205 and includes a contact 209 secured at the free end disposed in the arc-extinguishing chamber 204 and capable of engaging the stationary contact 206 when the arm is in its closed position. It is to be noted that, at its closed position the movable contact arm 208 should have at least one portion thereof substantially parallel to the stationary contact arm 205 and slightly spaced from the same. As in the previous arrangements, an insulation layer (not shown) may be disposed between the stationary and movable contact arms 205 and 208.

A curved tripping arm 210 is pivotably mounted on a pivot pin 211 projecting from a wall of the housing 201 and has a support member 212 for the movable contact arm 208 pivotably mounted at one end on the middle portion or the curved portion. The support member 212 has the other end fixed to the movable contact arm 208.

In order to move the movable contact arm 208 a rockable operating member 213 is rigidly secured thereto and pivotably supported at the free end on a pivot pin 214 disposed to the right of the pin 211 as viewed in FIG. 23. An operating spring 215 is operatively coupled at the respective ends to a nose 216 formed intermediate the ends of the movable contact arm 208 and a bottom surface of an insulating handle 213' integral with the operating member 213.

The other end of the tripping arm 210 normally engages a detent 217 secured to a tripping piece 218. The tripping piece 218 has one end resting in a recess 219 formed in the internal wall surface of the housing 201 and the other end pressed against the partition 202 for the arc-extinguishing chamber 204 through the action of a tripping spring 220.

The tripping piece 218 also has secured thereto an iron core 221 serving as a movable iron core. Disposed opposite to the movable iron core 221 and slightly spaced from the same is a stationary U-shaped magnet 222 with both legs of the magnet facing the movable iron core. A thermally responsive element such as a bimetal element 223 is disposed substantially parallel to the tripping piece 218 and extends through a space defined by the U-shaped stationary magnet 222. The bimetal element 223 is suitably secured at one end to the internal wall surface of the housing 201 and has the other end normally very close to an adjustable screw 224 screwed into the free end portion of the tripping piece 218. The one end of the bimetal element 223 is connected through an electrically conducting strip 225 to a terminal structure 226 disposed on the outside of the housing 201. A flexible conductor 227 connects the free end of the bimetal element 223 to that end of the movable contact arm 208 opposite to the movable contact 209.

The arc-extinguishing chamber 204 has therein a plurality of U-shaped arc-extinguishing metallic plates 228 and is vented to the exterior through a vent 229.

In order to manually close and open the interrupter thus far described, the operating handle 213' can be thrown to either of its positions, as the case may be, to displace that end of the operating spring 215 coupled to the handle to thereby engage the movable contact 209 with and disengage it from the stationary contact 206.

If the interrupter at its closed position has flowing therethrough an overload current below a predetermined value corresponding to fifty or sixty times its rated current, the bimetal element 223, the magnet 222 and the movable iron cores 221 respond to such an overload current to move the tripping piece 218 in the counterclockwise direction as viewed in FIG. 23 to thereby disengage the tripping arm 210 from the detent 217 resulting in release of the switching mechanism. In this way the tripping operation has been performed.

Upon the occurrence of a short circuiting current an electromagnetic repulsion is generated between the stationary and movable contact arms 205 and 208 in the same manner as previously described. This force exceeds the force of the operating spring 215 maintaining the movable contact in its closed position and hence regardless of the tripping mechanism the movable contact 209 is separated from the stationary contact 206 with a snap action.

In this case, however, the switching mechanism remains in its closed position. Therefore, immediately before or after the interrupting operation is performed through the separation of the contacts, the electromagnetic repulsion force will be attenuated resulting in a tendency for the movable contact 209 to re-engage the stationary contact 206.

In order to avoid this significant disadvantage, it is required that the tripping current flowing through thermally and electromagnetically responsive means 223, 221 and 222 be adjusted to such a magnitude that before reclosing the contacts, said means can be operated to disengage the tripping arm 210 from the detent 217 to free the operating member 213 from its closed position. In the arrangement illustrated in FIG. 23 the electromagnetic repulsion force due to a shortcircuiting current is such as to complete the interrupting operation within a total breaking time of from three to five tenths of one cycle of alternating current, while the thermal and electromagnetic trip mechanisms, which are adapted to be operated simultaneously with the aforesaid interrupting operation to disengage the detent 217 from the tripping arm 210, operate within two or three tenths of the cycle. This ensures that the reclosing operation is prevented and a stable open state results.

In the conventional type of circuit interrupters a period of time on the order of from two to six tenths of one cycle of alternating current is required for an automatic trip mechanism to respond to an overload current to disengage a tripping arm from the associated detent to thereby displace a fulcrum on which a movable contact arm is pivotably mounted. Thereafter, movement of the movable contact arm is initiated to disengage from the associated stationary contact arm.

On the contrary, the present invention eliminates the necessity of the passage of such a period of time by the utilization of an electromagnetic repulsion serving to perform directly the interrupting operation, while freeing the switching mechanism from its closed position. Therefore, the invention has provided circuit interrupters with greatly reduced interrupting time, limiting the magnitude of the shortcircuiting current and resulting in an increase in interrupting capacity. As an example, the invention has actually provided a circuit interrupter capable of interrupting a shortcircuiting current of 100,000 amperes which is similar in dimension to the fuseless circuit breakers of the standard type having a rated voltage of 400 volts, a rated current of 400 amperes and an interrupting capacity of from 20,000 to 30,000 amperes.

While the invention has been illustrated and described in conjunction with the certain preferred embodiments thereof it is to be understood that various variations in the details of construction and the combination and arrangement of parts may be resorted to without departing from the spirit and scope of the invention.

What is claimed is:

1. A circuit interrupter comprising a movable contact arm, a support member on which said movable contact arm is pivotably supported, a stationary contact arm, said contact arms being partly disposed in substantially parallel relationship, each of said contact arms having at the free end thereof a contact, operating means including resilient means operatively connected to said movable contact arm to effect opening and closing of said contacts, motive means responsive to overload current flow and spaced from said contact arms, tripping means coupled to and controlled by said motive means and including a movable member engaging one end of said resilient means, said interrupter having a longitudinally elongated groove within which said movable member moves to move the one end of the resilient means to perform a tripping operation, the said movable contact arm being rotatable to separate said contacts from each other independent of the operation of said operation means and said tripping mechanism under the force of an electromagnetic repulsion due to a flow of excessive current through both contact arms to produce an interruption of the associated circuit.

2. A circuit interrupter as claimed in claim 1, further comprising a second set of a stationary and a movable contact arm disposed in symmetric relationship to the first set of stationary and movable arms to provide two interrupting points, and a second resilient means coupled between said movable arm of the second set and said movable member.

3. A circuit interrupter as claimed in claim 2, wherein the said resilient means are helical snap springs operatively coupled to the movable contact arms, and said movable member is a movable shaft.

4. A circuit interrupter as claimed in claim 2 in which tripping means comprises a common mounting slide on which arms are rotatably supported, said movable member being movable relative to said slide.

5. A circuit interrupter as claimed in claim 4, wherein said mounting slide on which said movable contact arms are supported and said movable member are movable relative to each other to move the centers of rotation of said movable contact arms and the line of action of said springs past each other to reverse the direction of the force exerted by said helical springs thereby to effect opening and closing of said contacts.

6. A circuit interrupter comprising a vertically movable contact arm, a stationary contact arm substantially parallel to said movable contact arm, a switching rod movable substantially transversely of said movable contact arm, a pressure spring between said switching rod and said movable contact arm, said switching rod having a latch lever thereon, a lock lever engageable with said latch lever, an actuating rod on which said lock lever is mounted, a guiding block in which said latch lever is slidable in the direction of movement of said switching rod, an operating member and an operating handle engaged with said actuating rod for moving said actuating rod, lock lever, latch lever and switching rod to perform the normal opening and closing operations of said contact arms, a thermally responsive and electromagnetic means responsive to a flow of overload current, a tripping mechanism to which said last-mentioned means is coupled, an intermediate connecting lever rotatable by said tripping mechanism, a balancing lever with which the intermediate connecting lever is normally engaged and from which it is disengaged by rotation of said intermediate connecting lever, a balancing spring connected between said balancing lever and the lock lever the tension of which is reduced on releasing said balancing lever to release the lock lever from the latch lever to permit the pressure spring to move the movable contact arm, the force of electromagnetic repulsion due to a flow of a shortcircuiting current through both said contact arms being greater than the constraining force exerted by the balancing spring and disengaging the lock lever from the latch lever thereby to move the movable contact and perform an interrupting operation independent of the operation of said tripping mechanism.

7. A circuit interrupter as claimed in claim 6, further comprising a second stationary contact arm disposed in symmetric relationship with said stationary contact arm and said movable contact arm has two contacts thereon, one for each stationary contact arm.

8. A circuit interrupter as claimed in claim 6 further comprising an interrupting spring action on said movable contact in opposition to said pressure spring to increase the speed of the interrupting operation.

9. A circuit interrupter as claimed in claim 6, wherein said interrupter has a main body and said thermally responsive and electromagnetic means and said intermediate connecting lever are rigidly secured to the main body and said balancing lever, said lock lever and said latch lever are mounted on said switching rod and are vertically movable in accordance with the opertion of said operating handle.

10. A circuit interrupter comprising a fixed contact arm and a movable contact arm disposed in parallel relationship at least when they are in the closed position of the interrupter, a movable contact disposed at the free end of said movable contact arm, an operating spring having one end coupled to said movable contact arm for effecting opening and closing of said movable contact, an operating member having an operating handle thereon and pivoted on said interrupter, the other end of said spring being coupled to said operating member, a tripping arm having a member thereon coupled to said movable contact arm for effecting separation of said movable contact and pivoted on said interrupter, thermally responsive and electromagnetic tripping means responsive to a flow of overload current through both said contact arms to pivot said tripping arm and move said movable contact arm so that when an overload current of a predetermined magnitude flows through the interrupter said tripping arm, which is normally constrained with the movable contact arm in the closed position, is released by the operation of said tripping means to reverse the direction of a force provided by said operating spring which results in the opening of the interrupter and when a flow of shortcircuiting current generates an electromagnetic repulsion force between the parallel portions of said contact arm, said electromagnetic repulsion overcomes the force of said operating spring urging said movable contact arm toward its closed position to bring about an interrupting operation, said interrupter further comprising an iron core on said tripping means and a magnet on said interrupter which attacts said core simultaneously with said interrupting operation to disengage the tripping arm to permit reversing of the direction of the force of the operating spring constraining the movable contact arm in its closed position and thereby to prevent a reclosing of the interrupter because of a tendency of the operation spring to close the movable contact arm after the electromagnetic repulsion is attenuated resulting from the abovementioned interrupting operation and also to reduce the interruption time.

References Cited by the Examiner

UNITED STATES PATENTS

| | | | |
|---|---|---|---|
| 2,458,151 | 1/1949 | Dorfman et al. | 200—106 X |
| 2,688,675 | 9/1954 | Casey | 200—116 |
| 2,840,657 | 6/1958 | Roeser | 200—67 |
| 2,925,481 | 2/1960 | Casey | 200—87 X |
| 3,005,073 | 10/1961 | Reiss et al. | 200—87 X |

BERNARD A. GILHEANY, *Primary Examiner.*

T. MacBLAIN, H. BROOME, *Assistant Examiners.*